3,686,144
RECOVERY OF YEAST PROTEINS IN REFINED FORM AND WITH HIGH YIELD BY DEHYDRATION WITH AN ALKANOL FOLLOWED BY ACIDIC ESTERIFICATION
Masaki Tamura, Minami, Masayuki Yoda, Koenji, Seishi Shinya, Suginami, and Yaichi Ayukawa, Tokyo, Japan, assignors to CPC International Inc.
No Drawing. Filed Apr. 16, 1970, Ser. No. 29,244
Int. Cl. A23j *1/18*
U.S. Cl. 260—112 R                                   20 Claims

ABSTRACT OF THE DISCLOSURE

Protein is extracted from a microbiological protein source by solubilizing the protein by the formulation of protein that is esterified with a lower alkanol having up to three carbon atoms. The solubilized protein is then extracted, precipitated, and recovered. The process is particularly suited to the recovery of protein from yeast.

---

This invention relates to the recovery of protein from microbiological sources, and particularly, from yeast.

Yeast is known to have a relatively high nutrient value. It has been used as a source of food for man and as a component of fodder for animals. However, as with other cellular microbiological protein sources, the proteinaceous components of yeast are often not well utilized because of the difficulty of assimilating or breaking down the cell walls.

One object of the present invention is to provide an improved process for the separation and recovery of the proteinaceous components of microbiological protein sources, particularly yeast.

Another and more specific object of the invention is to provide an improved process for the recovery of protein from cellular microbiological protein sources, particularly yeast, with relatively high yield levels.

Other objects of the invention will be apparent hereinafter from the description that follows and from the scope of the appended claims.

GENERAL DESCRIPTION OF THE INVENTION

In accordance with one preferred mode for the practice of the process of the invention, the cellular microbiological protein source, such as yeast, for example, is dehydrated as by treatment with methanol; refluxed in an esterification medium such as, for example, an acidic lower alkanol, preferably methanolic hydrochloric acid, to solubilize the protein; and then the solubilized protein is recovered, as by extraction and subsequent precipitation by an alkali. The protein is recovered in high yield, free of cell wall material, and in readily useful, assimilable form. It is useful as a component in human foodstuffs and as an enriching material for animal feeds.

It has been found that RNA (ribonucleic acid) is substantially completely removed by the esterification step, that is, by the treatment with methanolic hydrochloric acid, for example. Moreover, interesting extracted material, containing many lipids, is obtained from the initial dehydration step. Thus, when pressed yeast is dehydrated with methanol, the extract is rich in lipids. Similarly, some degradation products of yeast RNA, such as necleotides, nucleotides, and bases, are abundantly contained in the fraction that is extracted from dehydrated yeast cells by methanolic hydrochloric acid.

One preferred technique for the practice of the invention, for the recovery of protein from yeast cells, involves dehydration of pressed yeast cells with methanol; refluxing of a suspension of the dehydrated cells in methanol containing anhydrous hydrochloric acid, with boiling at a pH of about 3.0 for several minutes; and then, extraction and subsequent precipitation of the solubilized protein at a pH of about 10. The recovery of protein generally exceeds 60% by weight, based on the original protein content of the yeast cells.

While we do not wish to be bound by any theory, we believe that, as a result of our treatment, the structure of the yeast cells is damaged by methanolysis of the polysaccharides, and that, simultaneously, carboxyl residues of the protein (glutamic acid and aspartic acid) are esterified by methanol. The protein becomes very soluble in water because of the esterification.

The content of methoxy groups in the recovered protein generally is from about 2.2% to about 2.5% by weight. The methoxy content is easily removed by alkaline esterification, as, for example, by treatment with 2% by weight of sodium hydroxide at about 25° C. for an hour or so.

OPERATING PARAMETERS

The lower alkanols that contain up to three carbon atoms are suitable for use in the esterification operation. Methanol is the most suitable. Thus, ethanol and propanol, for example, can be used, but their use results in lower recoveries of protein than are secured when methanol is used.

However, the use of alkanols per se is not necessary. So far as is known, any practical technique of esterification is satisfactory for the solubilization step. For example, treatment of the dehydrated cells with 1,2-epoxides in aqueous solution produces esterification and solubilization of the protein. However, other esterification techniques generally do not lead to as high recoveries as does esterification by methanol.

For solubilization by esterification, the cellular material must be treated at an acidic pH. The mineral acids are most convenient for producing the desired pH. The use of hydrochloric acid usually results in the best protein recoveries, superior, for example, to those obtained through the use of sulfuric acid. However, other acids and acidic materials can be employed, such as, for example, acetyl chloride and other acid chlorides and the like, that are decomposed in the esterification medium, with the ensuing liberation of hydrochloric acid or some other acid.

The invention is generally applicable to microbiological or single cell protein sources. From the practical standpoint, the microbiological protein will ordinarily be bacterial, fungal, or yeast protein, with yeast being the preferred protein source at present. A great number of different yeasts may be used. The yeast should be a strain that is satisfactory for use as a food yeast. A food yeast is one that possesses high nutritive value, agreeable flavor, biochemical and cultural stability, the ability to be propagated easily, and good appearance.

One preferred food yeast is a strain of *Candida utilis*, known as torula yeast, and often called *Torulopsis utilis*. Other satisfactory yeasts include *C. arborea, C. tropicalis, C. pulcherrima*, and *C. reukaufii; Hansenula anomola* and *H. suaveoleus; Trichlosporon pullulaus, Saccharomyces cerevisiae* (brewers' yeast), *Mycotorula japonica,* and *Zygosaccharomyces lactis.*

Torula yeast and brewers' yeast are particularly useful for treatment in accordance with the invention because both are rich in protein, vitamin, and other nutritive values.

Other microbiological protein sources, to which the invention can be applied, include bacteria, fungi, algae, and plankton. *Bacillus megaterium* cells are an interesting source of single cell protein, for example, in place of or along with yeast cells. Other bacteria that can be used include *Micrococcus glutamicus, Escherichia coli, Aerobacter aerogenes,* and *Clostridium butylicum*. Other useful microorganisms include fungi such as, for example,

*Penicillium notatum, P. chrysogenum, P. flavorglaucum, Aspergillus oryzae, A. niger,* and *Rhizopus nigricans;* Fungi imperfecti, such as, for example, *Oidium lactis, Fuasrium lini* and *F. graminearum;* Actinomycetes such as *Streptomyces griseus* and others; and single cell green algae, such as *Scendesmus obliguus, Chlorella ellipsoidea, Ch. vulgaris,* and *Ch. pyrenoidosa.*

One interesting way of exploiting the invention is by the use of the recovered protein for the enrichment of milk analogs based on vegetable protein, and other such foodstuffs.

SPECIFIC EXAMPLES

The following examples illustrate the invention by describing typical processes for recovering protein in good yield from cellular microbiological protein sources. These examples are meant to be illustrative only, and the invention, of course, is not to be limited thereto. Percentages and parts expressed herein are by weight unless expressly indicated to be otherwise. The abbreviation "D.S." refers to dry substance basis.

EXAMPLES 1–5

Treatment of yeast cells with methanolic hydrochloric acid

Pressed yeast cells (50 g. D.S.) were dispersed in 500 ml. of methanol. The dispersion was stirred for a short period of time at room temperature, then filtered on a Büchner funnel.

The cells were recovered, and the same procedure was repeated with another portion of 500 ml. of methanol.

The two filtrates were combined, then subjected first to vacuum evaporation and then to drying in a vacuum-oven. About 6 g. of a pasty mass remained after complete removal of the methanol.

Four other portions of yeast cells were treated in this way, separately. These cells were then processed further, to obtain the data that is presented before in Table I.

Generally, the procedure used in the further processing of these portions of dehydrated yeast cells was as follows.

Each portion of the dehydrated cells was further dispersed in another, fresh portion of 500 ml. of methanol, containing either anhydrous or concentrated aqueous hydrochloric acid, as indicated in Table I. The suspension was refluxed over a water bath, with continuous agitation. The suspension was then cooled and filtered. The cells were then washed with methanol and with ethyl ether, and dried in vacuum oven.

The dried, treated cells were then analyzed for RNA and protein content. For control purposes, one portion of cells was subjected to refluxing in methanol, without the addition of acid. Observations made on this portion of cells are reported in Table I below, opposite the entry, "Control." For comparative purposes, data from untreated yeast cells is also reported. The data observed are as follows.

TABLE I

| | | Hydrochloric acid added | | Treated cells, D.S. basis | | | |
|---|---|---|---|---|---|---|---|
| | | | | A | B | C | D |
| Example No. | Form | Concentration (N) | Refluxing period, min. | Yield, percent | True protein, percent | RNA, percent | Protein content remaining in cells |
| 1 | Anhydrous | 0.5 | 30 | 70.6 | 55.5 | 2.0 | 78.7 |
| 2 | do | 0.5 | 60 | 66.6 | 59.7 | 0.7 | 79.8 |
| 3 | do | 1.0 | 30 | 69.1 | 55.8 | 1.0 | 77.4 |
| 4 | Concentrated aqueous | 0.5 | 30 | 61.2 | 58.0 | 0.3 | 71.2 |
| Control | None | None | 60 | 80.4 | 54.5 | 8.0 | 88.0 |
| Original cells | | | | 100 | 49.8 | 7.7 | 100 |

Notes to Table I.—
1. Column A reports the weight of treated cells recovered as a percentage of their original untreated weight.
2. Column B reports a figure calculated by subtracting the RNA content of the cells (Column C) from the figure obtained by analysis of the yeast for protein; that is, each figure in Column B represents: Crude protein percent, as determined by analysis, less RNA percent.
3. Column D reports the content of protein in the treated cells, by a percentage figure that is calculated by first multiplying the weight of the recovered, treated cells (Column A figure, but treated as a weight figure rather than a percentage figure) by the percentage of true protein in those cells (Column B figure), then dividing by the amount of true protein in the original, untreated cells, which is 49.8% (Column B entry for original cells), and thus calculating the percentage. In other words, this calculation amounts to:

$$\frac{A \times B}{49.8} = D$$

The data in Table I demonstrate that the treated yeast cells retain a very substantial portion of their original protein content. Protein retention or integrity is enhanced when anhydrous hydrochloric acid is employed rather than aqueous hydrochloric acid. In addition, the treatment to this point has been effective in removing a very large part of the original RNA content.

To evaluate the solubility of the protein in the treated cells, an extraction was made. A 5 g., D.S., sample was taken of each batch of the treated cells, of the control cells, and of the original cells. Each of these samples was then further processed, individually, in the following way.

Each sample was dispersed in 100 ml. of water. The suspension was heated above a boiling water bath for 15 minutes, with continuous stirring, and under a reflux condenser. The suspension was then cooled rapidly. The remaining cells were then separated from the liquid by centrifuging the dispersion. The separated liquid was then analyzed for a protein content.

For comparative purposes, fifth batch of yeast cells was also processed, by refluxing in ethanol containing 0.5 N anhydrous hydrochloric acid. These treated cells were then also extracted, in the manner just described, by heating in water, and the recovered liquid was examined for protein content. The data relating to the ethanolic-hydrochloric acid treatment and extraction are reported below, in Table II, as Example 5, along with data for the other examples.

TABLE II

| Example: | Percent [1] |
|---|---|
| 1 | 39.9 |
| 2 | 75.3 |
| 3 | 65.7 |
| 4 | 56.6 |
| 5 | 37.3 |
| Control | 2.3 |

[1] Percent of original cell protein found in the extract.

As this data demonstrates, the treatment with methanolic hydrogen chloride markedly enhances the extractability of the protein content of the yeast cells. The effect is particularly marked when the concentration of the acid is above 0.5 N, and/or when the reaction period (the refluxing) extends longer than one hour. Also, the data demonstrates the effectiveness of ethanol but the superiority of methanol.

The extraction and recovery of the protein is also demonstrated in the following additional examples.

EXAMPLES 6–8

Extraction and recovery of yeast protein

The dehydration process and treatment with methanolic anhydrous hydrogen chloride were repeated, following the same procedural steps already described. The treated cells were separated, then extracted with water (1 liter per extraction) at 90° C. for either 15 or 30 minutes, as reported in Table III below. After rapid cooling, the cells were centrifugally separated from the extract. The separated cells were then washed by suspending them in 800 ml. of water, and again were centrifugally separated from the water.

The extract and wash water were then combined. The protein content was precipitated by adjusting the pH to 10 with sodium hydroxide. The precipitate was separated by centrifugation, was washed with two portions each of ethanol and ethyl ether, and finally was dried under an infrared lamp.

The pertinent data are reported in Table III below.

TABLE III

| | Treatment with methanolic hydrochloric acid | | | Protein recovery [1] | | |
|---|---|---|---|---|---|---|
| Example | Acid concentration (N) | Reflux period, min. | Extraction period, min. | Yield,[2] g., D.S. | Purity, percent | Recovery,[3] percent |
| 6 | 0.5 | 60 | 15 | 11.3 | 92.3 | 41.9 |
| 7 | 0.5 | 90 | 15 | 14.4 | 87.8 | 50.8 |
| 8 | 1.0 | 90 | 30 | 17.2 | 87.2 | 60.2 |

[1] No RNA at all was detected.
[2] The yield is based on 50 g., d.s., of original yeast cells.
[3] The recovery percentage is based on the true protein content of the original yeast cells (crude protein less RNA).

The data indicate that the highest protein recovery was obtained in Example 8. The yields of other fractions are reported below in Table IV.

As these data demonstrate, some of the contents of the yeast cells remains in the process liquids. Also, some of the original protein content of the yeast cells remains in the residual cell material, after the processing.

When the amounts of the protein precipitates are added to the total amounts recovered in other ways (last column in Table IV), respectively, the total amounts recovered in Examples 7 and 8, from each original 50 g. sample of yeast cells, are found to be 45.8 g., D.S., and 45.3 g., D.S., respectively.

EXAMPLE 9

In this demonstration of the invention, 100 parts of pressed yeast cells were dehydrated by dispersion in methanol at room temperature. The methanol was then separated from the cells and evaporated off. The residual extract is referred to as Fraction 1, and amounted to 12.2 parts D.S.

The dehydrated cells were then refluxed in methanolic, 1 N hydrogen chloride at 65° C. for 90 minutes. The treated cells were then separated, and 20.2 parts D.S. of solids were recovered from the methanolic hydrogen chloride. These solids are identified as Fraction 2.

The treated cells were then extracted with hot water at 90° C. for 30 minutes at pH 3.5. The residual cellular material, after extraction, amounted only to 12.0 parts D.S. The protein was precipitated from the aqueous extract by adjusting the pH to 10.

The supernatant liquid was separated from the precipitate, then evaporated off. The solid residue amounted to 12.8 parts, and is identified as Fraction 3.

The protein precipitate was dissolved in 1% aqueous sodium hydroxide, then reprecipitated at pH 4.5. The supernatant liquid was separated and evaporated off, to provide 28.8 parts of solid residue that is identified as Fraction 4. The thus-refined protein amounted to 28.6 parts.

Data with respect to the initial cells, cells in process, and end products, are reported below in Table V.

TABLE V

Yields and analytical values of intermediate and final products

| | | Analytical values on D.S. basis, percent | | |
|---|---|---|---|---|
| Sample | Yield (g., D.S.) | Crude protein | RNA | True protein [1] |
| Original yeast cells | 100 | 57.5 | 7.7 | 49.8 |
| Dehydrated cells | 90 | 58.2 | 9.7 | 48.5 |
| Cells treated with MeOH/HCl | 62 | 61.9 | 0.3 | 61.6 |
| Protein precipitate | 34 | 87.2 | 0 | 87.2 |
| Remaining cells | 12 | 22.8 | 0.1 | 22.7 |
| Refined protein | 29 | 95.1 | 0 | 95.1 |

[1] True protein percent = crude protein percent − RNA percent.

TABLE IV.—YEAST CELL FRACTIONS RECOVERED OTHER THAN PROTEIN PRECIPITATES

| | A | Composition of residual cell material, percent | | B | C | D | |
|---|---|---|---|---|---|---|---|
| | | | | Yields, g., D.S. | | | |
| Example | Residual cell material, g., D.S. | Crude protein | RNA | Fraction 1, from methanol used for dehydration | Fraction 2, from esterification medium | Fraction 3, left in liquid after protein precipitation | Total recovered (A+B+C+D) |
| 7 | 11.9 | 41.8 | 0.3 | 6.0 | 7.6 | 5.9 | 31.4 |
| 8 | 6.2 | 25.4 | 0.2 | 6.1 | 9.9 | 5.9 | 28.1 |

In Table IV, the data reports the yields of the fractions obtained from the dehydration, esterification, and precipitation recovery steps, respectively.

Data with respect to the several fractions, identified above, are reported below in Table VI.

TABLE VI
Yield and analytical values of intermediate and final products

| Sample | Yield (g., D.S.) | Percent Crude N | Carbohydrate[1] | Fat[2] | Ash[2] | Organic[2] P |
|---|---|---|---|---|---|---|
| Fraction 1 (residue from methanol dehydration) | 12 | 6.7 | 11.4 | 15.9 | 20.0 | 0.3 |
| Fraction 2 (residue from the methanolic HCl) | 20 | 6.2 | 29.7 | 6.6 | 15.9 | 5.1 |
| Fraction 3 (residue from supernatant liquid) | 13 | 3.4 | 52.6 |  | 21.3 |  |
| Fraction 4 | 29 | 2.2 | 14.6 |  | 70.4 |  |

[1] Determined by the phenol/$H_2SO_2$ method of Dubois et al. Anal. Chem., 28, 35 (1956), and expressed as pure glucose.
[2] Determined by the standard methods.

EXAMPLES 10–17

Effects of parameter changes

The effects of using different kinds of acid in methanol, different temperatures, and different treating times, are illustrated by the data that is presented in Table VII below, with respect to the recovery of protein from yeast cells.

TABLE VII

| Example No. | Kind and concentration of acid | Treating temperature, °C. | Treatment time, in hours | Protein recovered, percent Purity | Recovery[1] |
|---|---|---|---|---|---|
| 10 | Hydrochloric, 1 N | 65 | 1.5 | 87.2 | 60.2 |
| 11 | do | 65 | 2 | 84.2 | 57.3 |
| 12 | do | 65 | 3 | 84.5 | 55.8 |
| 13 | do | 30 | 24 | 98.9 | 38.2 |
| 14 | do | 40 | 6 | 86.1 | 57.2 |
| 15 | do | 50 | 5 | 82.4 | 57.3 |
| 16 | Sulfuric, 1 N | 65 | 1.5 | 82.8 | 44.3 |
| 17 | Acetyl chloride, 1 N[2] | 65 | 1 | 81.5 | 52.7 |

[1] Percent recovery of protein based on the true protein content of the original yeast.
[2] The acetyl chloride was added dropwise to the suspension of yeast in methanol. The mixture was then refluxed at 65° C. for one hour.

The yeast treated, in the demonstrations of the invention that are described in Table VII, was a pressed yeast having a crude protein content of 57.5% and an RNA content of 7.7%. The methoxyl content of the solubilized protein was generally about 2.2%, as compared to about 0.7% for the original yeast cells.

EXAMPLE 18

Treatment of chlorella

Chlorella was processed in accordance with the invention. The chlorella was dispersed in methanol at room temperature, with consequent removal of chlorophyll. The chlorella was then refluxed in methanolic 1 N HCl at 65° C. for 1.5 hours. The protein was then extracted from the treated chlorella and precipitated. The data are reported below.

TABLE VIII

| | Crude protein, D.S. percent | RNA, D.S. percent | Recovered protein yield (percent against original protein content) |
|---|---|---|---|
| Original chlorella | 61.6 | 6.9 |  |
| Treated chlorella | 85.0 | 0.0 | 69.5 |
| Recovered protein | 92.6 | 0.0 | 57.1 |

The recovery is considered excellent, particularly in comparison with other available techniques.

GENERAL

The protein precipitates produced by the process of the present invention are of good purity, as shown in Table III. However, further purification can easily be accomplished by many techniques. One convenient technique involves dissolving the precipitated protein in dilute alkali, then reprecipitating by adjusting the pH to the acid side, such as pH 4.5, for example. This simple additional purification step leads to yeast purities of 95% or more, with only a slight reduction in yield.

Generally, the amino acid composition of the original protein content of the microbiological protein source is not altered by the process of this invention.

The refined protein recovered by the process of this invention may be prepared, for example, in the form of a bland flavored flour that is uniform in color and almost white. It can be incorporated in flour as a source of protein enrichment for foods, such as, for example, bread, cookies, and other baked goods. It can be colored, flavored, and textured, to provide novel and interesting new types of components for prepared foods.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth, and as fall within the scope of the invention.

What is claimed is:

1. A process for the recovery of the protein content from a cellular microbiological protein source, comprising the following sequential steps:
   (a) dehydrating a cellular microbiological protein source by treating with a lower alkanol;
   (b) refluxing said dehydrated cellular protein source in an acidic esterification medium to convert the cellular protein to a soluble form of an ester; and
   (c) extracting said esterified and solubilized protein from its cellular source to recover in high yield, protein substantially free of cell wall material.

2. A process for the recovery of the protein content from a cellular food yeast, comprising the following sequential steps:
   (a) dehydrating said cellular food yeast by treating with a lower alkanol;
   (b) refluxing said dehydrated cellular food yeast in acidic esterification medium to convert the cellular protein to soluble form of an ester; and
   (c) extracting said esterified and solubilized protein from its cellular food yeast source to recover in high yield, protein substantially free of cell wall material.

3. A process for the recovery of the protein content of a cellular food yeast, comprising the following sequential steps:
   (a) dehydrating the cellular food yeast in substantially anhydrous methanol;
   (b) heating the cellular food yeast in methanolic hydrogen chloride to convert the cellular protein into a soluble form of an ester; and
   (c) extracting the esterified and solubilized protein from the cellular food yeast to recover in high yield, protein substantially free of cell wall material.

4. A process for the recovery of the protein content of a cellular food yeast, comprising the following sequential steps:
   (a) dehydrating the cellular food yeast by dispersing it in substantially anhydrous methanol;
   (b) refluxing said dehydrated yeast in methanolic hydrogen chloride to convert the cellular protein to a soluble form of an ester;
   (c) extracting the solubilized protein from the cellular food yeast with hot water to recover in high yield, protein substantially free of cell wall material;
   (d) precipitating the protein from the aqueous extract by adjusting the pH of the extract to the alkaline side; and
   (e) recovering the precipitated protein.

5. A process in accordance with claim 1, wherein the protein source is yeast.

6. A process in accordance with claim 1, wherein the acidic environment is provided by a mineral acid.

7. A process in accordance with claim 1, wherein the protein source is subjected to esterification by reacting it with a lower alkanol having up to three carbon atoms.

8. A process in accordance with claim 7, wherein the alkanol is methanol.

9. A process in accordance with claim 8 wherein the acidic environment is provided by the presence of hydrochloric acid.

10. A process in accordance with claim 2, wherein the acidic environment is provided by hydrochloric acid.

11. A process in accordance with claim 2, wherein the yeast is subjected to esterification by reacting it with methanol.

12. A process in accordance with claim 2, wherein the acidic environment is provided by hydrochloric acid and the yeast is subjected to esterification by reacting it with methanol.

13. A process in accordance with claim 2, wherein the recovery of the solubilized protein comprises:
   extracting the solubilized protein from the yeast by aqueous extraction, then
   precipitating the protein from the aqueous extract, and recovering the precipitated protein.

14. A process in accordance with claim 2, including the preliminary step of washing the yeast with methanol.

15. A process in accordance with claim 3, including the preliminary step of extracting the yeast cells with methanol.

16. A process in accordance with claim 3, wherein the heating is at reflux temperature.

17. A process in accordance with claim 3, wherein the recovery of the solubilized protein comprises:
   extracting the solubilized protein from the yeast with hot water;
   precipitating the protein from the water extract by adjusting the pH to the alkali side, and then
   recovering the precipitated protein.

18. A process in accordance with claim 3 wherein the concentration of hydrochloric acid is about 1 N and the heating time is from a few minutes up to a few hours.

19. A process in accordance with claim 4, wherein the refluxing is carried out at about 65° C. at a concentration of hydrogen chloride of about 1 N and for a period of time from a few minutes to a few hours.

20. A process in accordance with claim 4, wherein the recovered proteins are further refined by dissolution in dilute alkali and reprecipitated by adjusting the pH to the acid side.

References Cited

UNITED STATES PATENTS

| | | | |
|---|---|---|---|
| 1,869,721 | 8/1932 | Sure | 424—195 |
| 2,184,748 | 12/1939 | Light et al. | 424—252 |
| 2,193,876 | 3/1940 | Maizel | 424—195 |
| 2,603,630 | 7/1952 | Aries | 260—112 |
| 3,121,665 | 2/1964 | Parfentjev | 424—177 |

OTHER REFERENCES

Chem. Abstracts, vol. 31, 716 and 10318, Warburg, 1937.

Chem. Abstracts, vol. 31, 8560[9], 8561[1-4], Warburg et al., 1937.

Analytical Methods of Protein Chemistry, vol. 1, 1960, Alexander et al., pp. 3–7, 44–45, 68–69 and 82.

HOWARD E. SCHAIN, Primary Examiner

U.S. Cl. X.R.

99—14, 63, 86, 90 HP, 93